(12) United States Patent
Yamamoto

(10) Patent No.: US 10,712,030 B2
(45) Date of Patent: Jul. 14, 2020

(54) AIR-CONDITIONING SYSTEM

(71) Applicant: Mitsubishi Electric Corporation, Tokyo (JP)

(72) Inventor: Keiichi Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 78 days.

(21) Appl. No.: 16/068,466

(22) PCT Filed: Mar. 14, 2016

(86) PCT No.: PCT/JP2016/057901
§ 371 (c)(1),
(2) Date: Jul. 6, 2018

(87) PCT Pub. No.: WO2017/158668
PCT Pub. Date: Sep. 21, 2017

(65) Prior Publication Data
US 2019/0024916 A1    Jan. 24, 2019

(51) Int. Cl.
*F24F 11/00* (2018.01)
*F24F 11/56* (2018.01)
(Continued)

(52) U.S. Cl.
CPC ........ *F24F 11/0001* (2013.01); *F24F 1/0007* (2013.01); *F24F 11/56* (2018.01);
(Continued)

(58) Field of Classification Search
None
See application file for complete search history.

(56) References Cited

U.S. PATENT DOCUMENTS 5,097,672 A * 3/1992 Takenaka ............... F24F 1/00
62/186
9,285,134 B2 * 3/2016 Bray ................. G05D 23/1902
(Continued)

FOREIGN PATENT DOCUMENTS

JP    2010-266169 A    11/2010
JP    2012-154522 A    8/2012
JP    2013-181671 A    9/2013

OTHER PUBLICATIONS

Office Action dated Jun. 18, 2019 in the corresponding JP patent application No. 2018-505058 (with English translation).
International Search Report ("ISR") dated May 10, 2016 issued in corresponding international patent application No. PCT/JP2016/057901.
Office Action dated Dec. 3, 2019 in the corresponding JP patent application No. 2018-505058 (and English translation).

*Primary Examiner* — Ramesh B Patel
(74) *Attorney, Agent, or Firm* — Posz Law Group, PLC

(57) ABSTRACT

An air-conditioning system includes two or more air-conditioning devices A, each of which in turn includes a fan adapted to adjust a volume of air blown out into a space to be air-conditioned, an airflow direction adjuster adapted to adjust an airflow direction of outlet air blown out by the fan, a human detection sensor adapted to detect human presence, an inlet air temperature sensor adapted to detect temperature of inlet air sucked in by the fan, a position setting device used to set an installation location of each of the air-conditioning devices, and a controller, in which a positional relationship with an adjacent air-conditioning device is calculated based on data from the position setting device and furthermore a human detection area overlap with the adjacent air-conditioning device is calculated.

10 Claims, 7 Drawing Sheets

(51) Int. Cl.
*F24F 11/65* (2018.01)
*F24F 11/74* (2018.01)
*F24F 11/79* (2018.01)
*G05B 19/042* (2006.01)
*F24F 11/89* (2018.01)
*G05B 15/02* (2006.01)
*F24F 1/0007* (2019.01)
*F24F 1/0047* (2019.01)
*F24F 120/12* (2018.01)

(52) U.S. Cl.
CPC .............. *F24F 11/65* (2018.01); *F24F 11/74* (2018.01); *F24F 11/79* (2018.01); *F24F 11/89* (2018.01); *G05B 15/02* (2013.01); *G05B 19/042* (2013.01); *F24F 1/0047* (2019.02); *F24F 2120/12* (2018.01); *F24F 2221/38* (2013.01); *G05B 2219/2614* (2013.01)

(56) References Cited

U.S. PATENT DOCUMENTS

| | | | |
|---|---|---|---|
| 2006/0212174 A1* | 9/2006 | Garmon | F24F 11/30 700/276 |
| 2008/0283621 A1* | 11/2008 | Quirino | F24F 11/30 236/1 C |
| 2010/0298986 A1 | 11/2010 | Stachler | |
| 2012/0072032 A1* | 3/2012 | Powell | F24F 11/30 700/278 |
| 2014/0158782 A1* | 6/2014 | Kates | G05D 23/1934 236/1 B |
| 2017/0059187 A1* | 3/2017 | Smith, Jr. | F24D 19/109 |
| 2017/0069923 A1* | 3/2017 | Trevisan | H01M 8/2475 |

\* cited by examiner

AIR-CONDITIONING SYSTEM

CROSS REFERENCE TO RELATED APPLICATION

This application is a U.S. national stage application of PCT/JP2016/057901 filed on Mar. 14, 2016, the contents of which are incorporated herein by reference.

TECHNICAL FIELD

The present invention relates to an air-conditioning system that includes two or more air-conditioning devices each equipped with a two-way or higher-order air outlet and a human detection sensor.

BACKGROUND ART

Regarding conventional air-conditioning systems, human detection sensors are adopted in room-air conditioners and other devices. The human detection sensors detect persons and allow air conditioning to be done by taking human comfort into consideration and are adopted not only in room-air conditioners, but also in cassette type four-way airflow indoor units and cassette type two-way airflow indoor units, which are air-conditioning apparatuses for commercial use (see, for example, Patent Literature 1). The technique described in Patent Literature 1 relates to an air-conditioning device (indoor unit) that includes: a human detection sensor adapted to detect any human presence in each of a plurality of air-conditioning zones; an indoor air temperature sensor adapted to detect indoor temperature in a single air-conditioning zone or each of the plurality of air-conditioning zones; and a louver provided with a two-way or higher-order air outlet and configured to allow airflow directions to be changed individually, wherein when the indoor temperature detected in the single air-conditioning zone or any of the plurality of air-conditioning zones changes after a human is detected, control is performed to automatically change the airflow direction in the air-conditioning zone in which the human is detected.

CITATION LIST

Patent Literature

Patent Literature 1: Japanese Unexamined Patent Application Publication No. 2012-154522

SUMMARY OF INVENTION

Technical Problem

Now, to air-condition the same floor of a building with conventional air-conditioning devices, the same floor is often air-conditioned by deploying plural air-conditioning devices. In so doing, in perimeter zones such as zones by the windows susceptible to changes in outside conditions, plural air-conditioning devices may sometimes be placed close to one another. When an air-conditioning device is equipped with a human detection sensor adapted to detect persons, the air-conditioning device may sometimes detect an area overlapping a human detection area of another air-conditioning device installed in a vicinity. In that case, if plural air-conditioning devices control to blow air toward the human detected by the human detection sensors, all the plural air-conditioning devices detecting the same person will perform air conditioning directed at the location of the person, which might impair the comfort of the person, causing the person to feel too cool or too hot. This results in energy loss.

The present invention has been made to solve the above problem and has an object to provide air-conditioning system that can save energy without impairing human comfort, by adjusting outlet air volumes and airflow directions between/among air-conditioning devices capable of detecting human presence in a same area.

Solution to Problem

An air-conditioning system according to an embodiment of the present invention comprises two or more air-conditioning devices, characterized in that: each of the air-conditioning devices includes a fan adapted to adjust a volume of air blown out into a space to be air-conditioned, an airflow direction adjuster adapted to adjust an airflow direction of outlet air blown out by the fan, a human detection sensor adapted to detect human presence, an inlet air temperature sensor adapted to detect temperature of inlet air sucked in by the fan, a position setting device used to set an installation location of each of the air-conditioning devices, and a controller adapted to control the fan and the airflow direction adjuster; and the controller of the air-conditioning device calculates a positional relationship with an adjacent air-conditioning device based on input signal data from the position setting device and calculates a human detection area overlap based on a human detection area of the human detection sensor in the adjacent air-conditioning device.

Advantageous Effects of Invention

With the air-conditioning system according to an embodiment of the present invention, since the controller of each of the air-conditioning devices is configured to calculate the positional relationship with the adjacent air-conditioning devices based on input signal data from the position setting device and calculate a human detection area overlap based on a human detection area of the human detection sensor in the adjacent air-conditioning devices, the thus calculated human detection area overlap of the plural air-conditioning devices can be used. That is, when plural air-conditioning devices whose human detection areas overlap one another air-condition same air-conditioning zones, the air-conditioning of an air-conditioning zone in which a person is present can be adjusted. This provides the advantage of being able to do air-conditioning without waste and without impairing comfort, by avoiding overcooling, and thereby increase energy savings.

DESCRIPTION OF EMBODIMENTS

Embodiment 1

Figure 1:
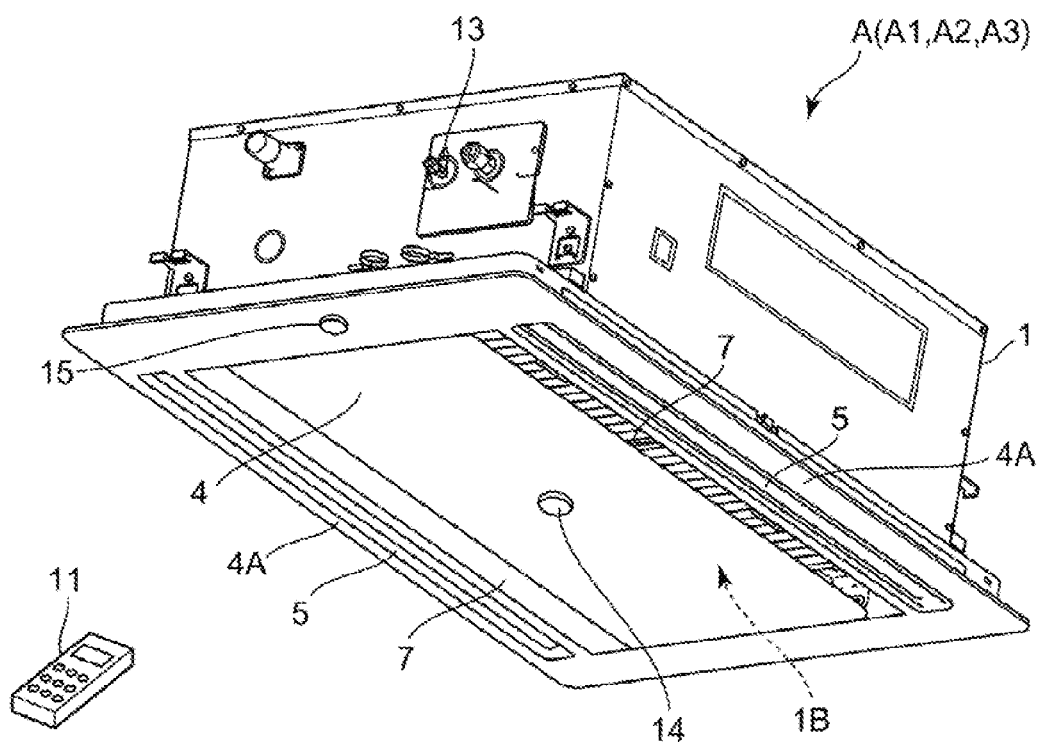
FIG. 1 is a perspective view of an air-conditioning device of an air-conditioning system according to an embodiment of the present invention as viewed obliquely from below.
Figure 2:
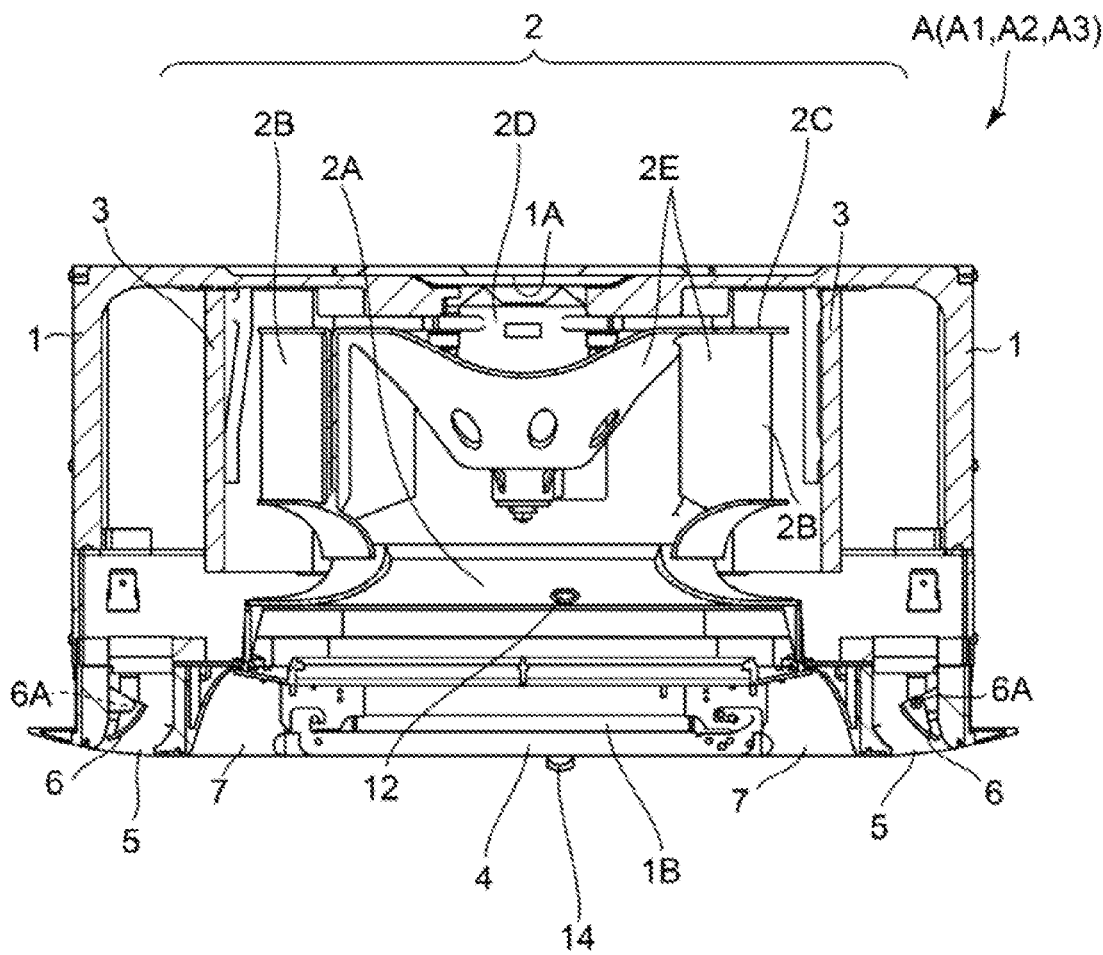
FIG. 2 is a front sectional view of the air-conditioning device.

FIG. 1 is a perspective view of an air-conditioning device of an air-conditioning system according to an Embodiment 1 of the present invention as viewed obliquely from below, and FIG. 2 is a front sectional view of the air-conditioning device.

In FIGS. 1 and 2, the air-conditioning system of the present embodiment includes two or more air-conditioning devices A (A1, A2, A3). Each of the air-conditioning devices A is a cassette type indoor unit making up part of an overall air-conditioning apparatus (not shown) equipped with a refrigerant circuit. Each of the air-conditioning devices A includes a body casing 1 shaped like a rectangular box with an open bottom, a fan 2 attached to a top side 1A inside the body casing 1, a heat exchanger 3 put in place by surrounding the fan 2 in the body casing 1 and configured to allow free passage of air therethrough, a panel 4 attached to an edge portion of a bottom opening 1B in the body casing 1 and adapted to lid the bottom opening 1B, a pair of right and left air outlets 5 formed on opposing sides 4A of the panel 4, vanes 6 (an example of an airflow direction adjuster) put in place in respective air outlets 5 and adapted to change outlet flow directions of outlet air, and a pair of right and left air inlets 7 formed at inner positions of the air outlets 5 in the panel 4.

The heat exchanger 3 described above makes up part of the refrigerant circuit and includes an inlet-side pipe connector and outlet-side pipe connector (neither is shown) to be connected to refrigerant pipes of the refrigerant circuit. Also, the fan 2 includes a fan casing 2C attached to the top side 1A inside the body casing 1, with a bottom opening 2A being communicated with the air inlets 7 in the panel 4, and a fan air outlet 2B being formed in a side face; a fan motor 2D attached to a top side of the fan casing 2C; and a fan 2E attached to a rotating drive shaft of the fan motor 2D. The vanes 6 are swingablly supported in the respective air outlets 5, and swinging drive shafts 6A of the vanes 6 are coupled to airflow direction control motors 6B (not shown in FIGS. 1 and 2) put in place in the body casing 1.

Figure 3:
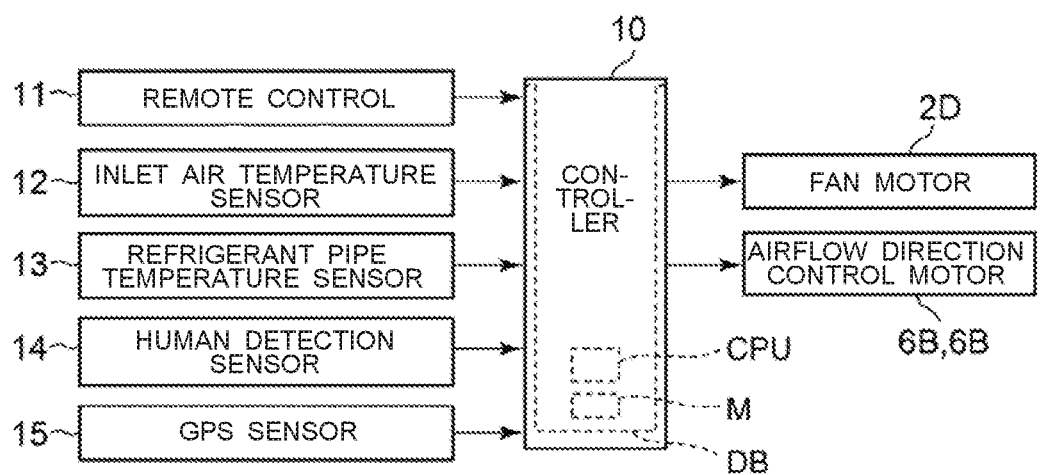
FIG. 3 is a schematic block diagram showing a control structure of the air-conditioning device.

Furthermore, each of the air-conditioning devices A includes a controller 10 embodied by a microcomputer as shown in FIG. 3. The microcomputer includes a central processing unit CPU, a memory M, and a data bus DB. An input side of the data bus DB is connected with a remote control (an example of a position setting device) 11, an inlet air temperature sensor 12, a refrigerant pipe temperature sensor 13, a human detection sensor 14, and a GPS sensor (an example of a position setting device) 15 in such a way as to be ready for data communications. The GPS sensor 15 has a function to receive a signal from satellites of the Global Positioning System (GPS) and thereby detect an installation position and bearing of the air-conditioning device A. Note that position data about the installation position can be set externally in advance using the remote control 11 and stored in the memory M or another storage unit. An output side of the data bus DB is connected with drivers (not shown) adapted to drive the fan motor 2D and airflow direction control motors 6B, respectively, in such a way as to be ready for data communications. The memory M stores control program data for the air-conditioning device, various control target data entered via the remote control 11 in advance, and detection value data received from various sensors and held tentatively.

Next, operation will be described. In the air-conditioning device configured as described above, indoor air is sucked in through the air inlet 7 when the fan 2 is driven and the sucked-in air is blown out through the fan air outlet 2B in the fan casing 2C to exchange heat with refrigerant when passing through the heat exchanger 3 and thereby condition the air. As the air-conditioning air is blown out through the air outlets 5, the room is air-conditioned. Also, airflow directions are designed to be adjusted by changing angles of the vanes 6 provided in the air outlets 5. Based on transmit data from the remote control 11 and detection data from the inlet air temperature sensor 12, human detection sensor 14, and refrigerant pipe temperature sensor 13, the controller 10 controls the outlet air volumes through the air outlets 5 by changing fan rotation speed of the fan 2 and controls airflow directions by changing orientations of the vanes 6.

Figure 4:
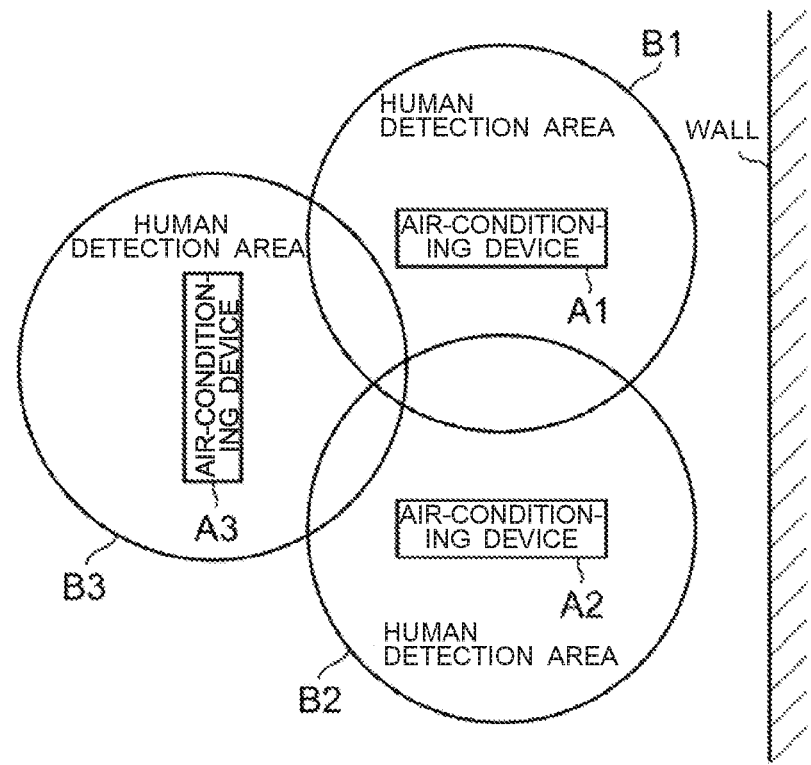
FIG. 4 is a plane arrangement showing an exemplary layout of three air-conditioning devices.

FIG. 4 is a diagram showing an installation example of the air-conditioning devices (cassette type two-way airflow indoor units) according to the present embodiment. As shown in FIG. 4, in a location with a high air conditioning load, such as a perimeter zone, plural (three in this example) air-conditioning devices A1, A2, and A3 tend to be deployed densely, often resulting in overlaps among air-conditioning areas of the air-conditioning devices. In so doing, when the air-conditioning devices A1, A2, and A3 have a function to detect human presence using the human detection sensor 14 and air-condition their air-conditioning zones, human detection areas B1, B2, and B3 often overlap among the three air-conditioning devices A1, A2, and A3, and consequently same air-conditioning zones are air-conditioned simultaneously.

In this case, it is necessary to make the plural air-conditioning devices A1, A2, and A3 to recognize at what distances they are placed from one another. Thus, the air-conditioning devices A1, A2, and A3 are made to recognize at what distances they are located from one another and in what directions, by detecting position signals using the respective GPS sensors 15. Alternatively, by presetting position data about directions and distances of adjacent air-conditioning devices via the remote control 11, the air-conditioning devices can be made to recognize their positional relationships to one another. In this way, the air-conditioning devices are made to recognize positions of their adjacent air-conditioning devices and thereby recognize overlapping areas among air-conditioning zones to be air-conditioned and overlapping areas among human detection areas.

In air-conditioning done by detecting human presence, air-conditioning in which persons are exposed to direct airflow (hereinafter referred to as "direct airflow") and air-conditioning in which persons are not exposed to direct airflow (hereinafter referred to as "indirect airflow") are conceivable, and these methods will be described below.

Firstly, a direct airflow control mode is used in an Auto mode when angles (airflow direction settings) of the vanes 6 adapted to manipulate the airflow direction of outlet air has not been set and a direct airflow function has been set via the remote control 11. The control described below is also used when automatic air volume control is enabled.

Figure 5:
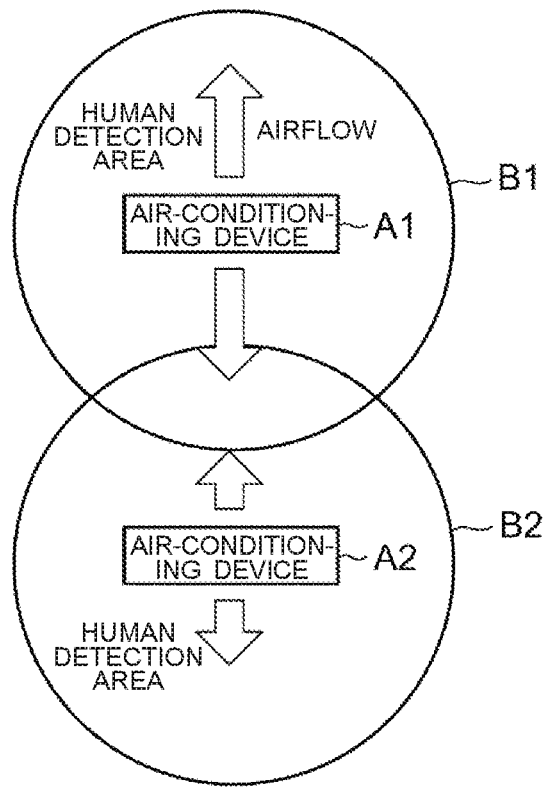
FIG. 5 is an explanatory diagram showing a control example of two air-conditioning devices.

When a person is located at an overlapping position between the human detection areas B1 and B2 of two air-conditioning devices A1 and A2 as shown in FIG. 5, if the direct airflow control mode is set, normally the air-conditioning air is set to the air-conditioning zones in which the person is detected by both the air-conditioning devices A1 and A2. In that case, since winds come from two air-conditioning devices A1 and A2, if the person is located in the air-conditioning zones whose human detection areas overlap, the person may feel cold during cooling. Thus, as a setting that takes an extent of direct airflow into consideration, an energy-saving setting is made. The energy-saving setting adjusts air-conditioning of an area in which air-conditioning zones overlap by doing air-conditioning using one of the air-conditioning devices and reducing the outlet air volume of the other air-conditioning device. In the direct airflow control mode, the energy-saving setting is made according to the level of energy-saving. When the level of energy-saving is high, such as when human detection areas overlap and there is no person in the areas other than the overlapping area, one of the air-conditioning devices A1 and A2 is stopped. On the other hand, when the level of energy-saving is low, the outlet air volume is lowered by one step (e.g., the level is lowered from the highest step to the second highest step in the case of a three-step setting). If no energy-saving setting is specified in the direct airflow control mode, the outlet air volume is not lowered.

In so doing, regarding which of the air-conditioning devices A1 and A2 will adjust its air-conditioning, the following three procedures are followed.

Rule 1: Any air-conditioning device that detects a person outside a human detection area overlap between the human detection sensors 14 controls to not reduce the outlet air volume.

Rule 2: Any air-conditioning device that detects no person outside a human detection area overlap between the human detection sensors 14 can reduce its own outlet air volume if the other overlapping air-conditioning device cannot reduce its own outlet air volume (because human presence is detected in its own human detection area other than the overlap). If the overlapping air-conditioning devices can reduce their own outlet air volumes (i.e., if there is no person in the human sensor detection areas of both the adjacent air-conditioning devices other than the human detection area overlap), only one of the air-conditioning devices is allowed to reduce the outlet air volume, by controlling to reduce the outlet air volume of the air-conditioning device, of which a temperature difference between a preset target inlet air temperature and a detected inlet air temperature detected by the inlet air temperature sensor 12 is smaller.

Rule 3: When three or more air-conditioning devices A1, A2, and A3 are located next to one another, if an air-conditioning device having a human detection area that overlaps with one air-conditioning device is located adjacent to an air-conditioning device having a human detection area that overlaps with two air-conditioning devices, priority for outlet air volume reduction is given to the air-conditioning device having a human detection area that overlaps with one air-conditioning device, and thus an air-conditioning device with fewer human detection area overlaps has its priority for outlet air volume reduction increased. When air-conditioning devices with a same number of overlaps are located adjacent to each other, a setting is made such that a higher priority for outlet air volume reduction will be given to the air-conditioning device having a smaller difference between the target temperature and set temperature described in Rule 2.

In this way, if any overlap in human detection areas is recognized in direct airflow control mode, the appropriate air-conditioning devices make such settings as to control the outlet air volumes between/among themselves. The above procedures increase the number of air-conditioning devices that can reduce their outlet air volumes and thus enable control promising a greater energy-saving effect.

Now, description will be given of control operation involving two air-conditioning devices A1 and A2 located adjacent to each other. Note that in the following description, the air-conditioning device will be referred to as a "unit" for ease of understanding. This similarly applies to the flowchart described in FIGS. 6 and 7 later.

First, using the GPS sensors 15, it is checked whether or not there are adjacent units overlapping in human detection areas. When the airflow directions and outlet air volumes of a given unit and adjacent unit are both set automatically and the units are in direct airflow control mode, if there is a person only in the overlap between the given unit and adjacent unit within the human detection area of the given unit and there is a person in the human detection area of the adjacent unit but outside the human detection area overlap between the given unit and adjacent unit, the outlet air volume of the given unit is reduced (energy-saving setting: low) or the fan 2 of the given unit is stopped (energy-saving setting: high). When there is a person only in the overlap between the given unit and adjacent unit within the human detection area of the given unit and there is no person in the human detection area of the adjacent unit outside the human detection area overlap between the given unit and adjacent unit, the given unit or adjacent unit, whichever has a smaller temperature difference between the target inlet air temperature and detected inlet air temperature, is controlled to reduce its outlet air volume (energy-saving setting: low) or stop its fan 2 (energy-saving setting: high).

Figure 6:
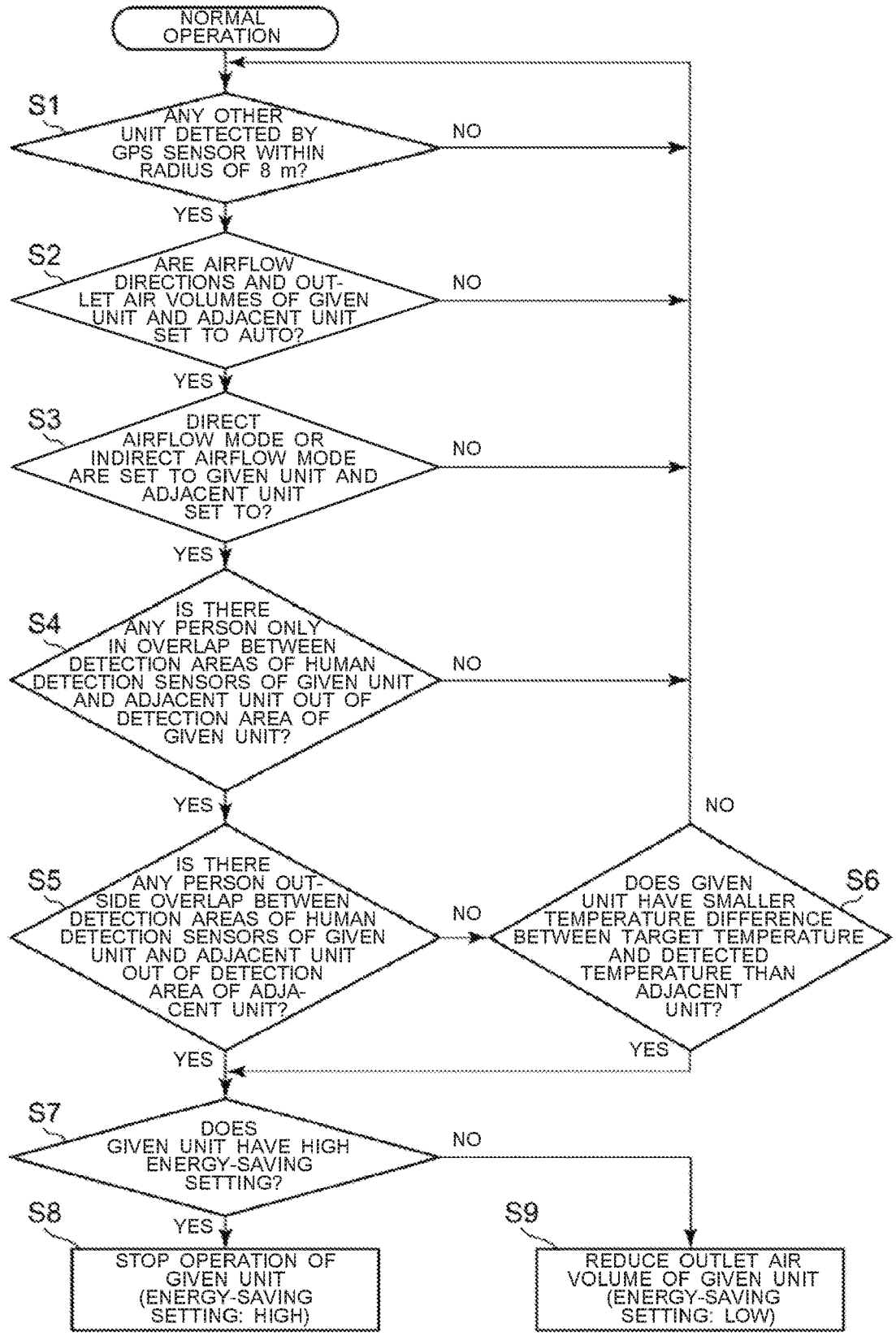
FIG. 6 is a flowchart showing an exemplary control operation of the air-conditioning device.

Here, details of the control operation involving the two units A1 and A2 located adjacent to each other are shown in the flowchart of FIG. 6.

First, the processing unit CPU of the controller 10 of one unit A1 receives position coordinate data from the GPS sensor 15 of the other unit A2, and determines whether the unit A2 is located within a radius of 8 m from the unit A1 (step S1). When the distance between the unit A1 and unit A2 is equal to or less than 8 m (Y), the processing unit CPU advances to step S2, but when the distance exceeds 8 m (N), the processing unit CPU returns to the process of step S1. In step S2, when the respective airflow directions and outlet air volumes of the unit A1 and adjacent unit A2 are set to Auto (Y), the processing unit CPU advances to step S3, but when the airflow directions and outlet air volumes are not set to Auto (N), the processing unit CPU returns to the process of step S1. In step S3, if the respective control modes of the unit A1 and adjacent unit A2 are set to Direct Airflow or Indirect Airflow (Y), the processing unit CPU advances to step S4, but if the control modes are not set to Direct Airflow or Indirect Airflow (N), the processing unit CPU returns to the process of step S1. In step S4, when there is a person only in the overlap between the human detection areas of the respective human detection sensors 14 of the unit A1 and adjacent unit A2 (Y), the processing unit CPU advances to step S5, but when there is any person outside the overlap (N), the processing unit CPU returns to the process of step S1.

Subsequently, in step S5, when there is any person outside the overlap between the human detection areas B1 and B2 of the respective human detection sensors 14 of the unit A1 and adjacent unit A2 (Y), the processing unit CPU advances to step S7, but when there is no person outside the overlap (N), the processing unit CPU advances to the process of step S6. In step S6, when the temperature difference between a target inlet air temperature set in advance by the unit A1 and an inlet air temperature (which corresponds to indoor temperature) detected by the inlet air temperature sensor 12 is smaller than the temperature difference between a target inlet air temperature and detected inlet air temperature in the adjacent unit A2 (Y), the processing unit CPU advances to step S7, but when the temperature difference of the unit A1 is equal to or larger than the temperature difference of the adjacent unit A2 (N), the processing unit CPU returns to the process of step S1. In step S7, when energy-saving operation of the unit A1 is set at a high level (Y), the processing unit CPU advances to step S8 and stops operation of the unit A1. On the other hand, when the unit A1 is set at a high level of energy-saving operation (N), the processing unit CPU advances to step S9 and reduces the outlet air volume by controlling the fan motor 2D of the unit A1.

As described above, since the present embodiment is configured to calculate a human detection area overlap based on the human detection areas B1 and B2 of the human detection sensors 14 in the two adjacent air-conditioning devices A1 and A2, the thus calculated overlap between the human detection areas B1 and B2 of the plural air-conditioning devices A1 and A2 can be used. That is, when the two air-conditioning devices A1 and A2 whose human detection areas B1 and B2 overlap each other air-condition a same air-conditioning zone, the air-conditioning of an air-conditioning zone in which a person is present can be adjusted. This makes it possible to do air-conditioning without waste and without impairing comfort, by avoiding overcooling, and thereby increase energy savings.

Embodiment 2

Whereas the control operation involving two air-conditioning devices A1 and A2 located adjacent to each other has been shown in Embodiment 1, Embodiment 2 that involves controlling three or more units located adjacent to each other will be described next.

A case in which three or more units A1 A2, and A3 are located adjacent to each other in this way is similar to the above-described case in which two units A1 and A2 are located adjacent to each other except for details of detection by the human detection sensors 14. First, using the GPS sensors 15, it is checked whether or not there are adjacent units overlapping in human detection areas. When the airflow directions and outlet air volumes of a given unit and adjacent unit are both set automatically and the units are in direct airflow control mode, if there is a person only in the detection area overlap between the given unit and adjacent unit within the human detection area of the given unit and there is a person in the human detection area of the adjacent unit but outside the human detection area overlap between the given unit and adjacent unit, the outlet air volume of the given unit is reduced (energy-saving setting: low) or the fan 2 of the given unit is stopped (energy-saving setting: high). When there is a person only in the detection area overlap between the given unit and adjacent unit within the human detection area of the given unit and there is no person in the human detection area of the adjacent unit outside the human detection area overlap between the given unit and adjacent unit, if in the human detection area, the number of overlaps with an adjacent unit is smaller than the number of overlaps with another adjacent unit, the outlet air volume of the given unit is reduced (energy-saving setting: low) or the fan 2 of the given unit is stopped (energy-saving setting: high). When the numbers of overlaps are equal, the given unit or adjacent unit, whichever has a smaller difference between the target inlet air temperature and detected inlet air temperature, is made to reduce its outlet air volume (energy-saving setting: low) or stop its fan 2 (energy-saving setting: high).

Figure 7:
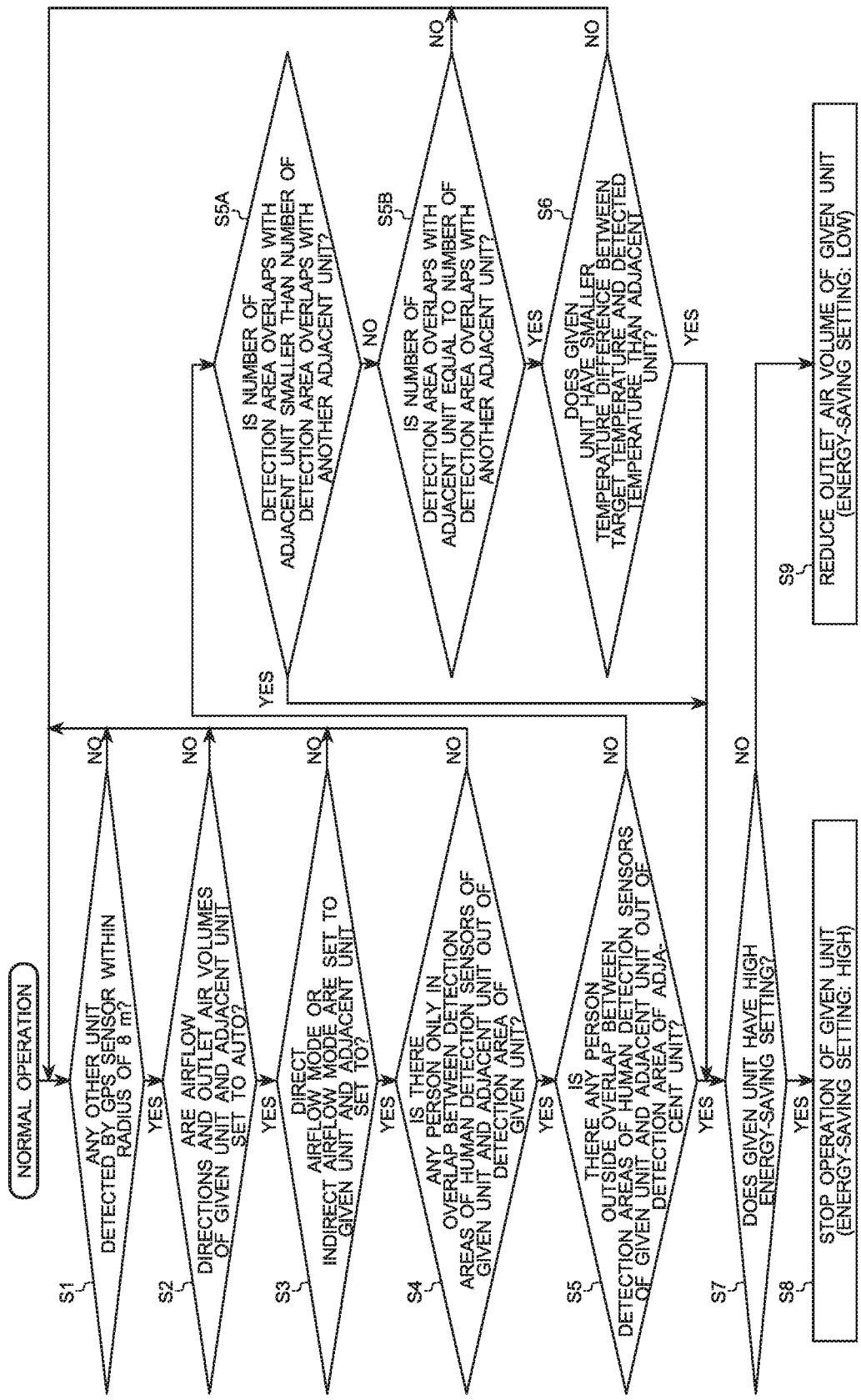
FIG. 7 is a flowchart showing another exemplary control operation of the air-conditioning device.

Details of the control operation involving the three units A1, A2, and A3 located adjacent to each other are shown in the flowchart of FIG. 7. Note that the processing procedures shown in the flowchart of FIG. 7 differ from the processing procedures of Embodiment 1 shown in the flowchart of FIG. 6 in that the process of step S5A and process of step S5B are newly provided between step S5 and step S6.

That is, according to the flowchart of FIG. 7, in step S5, when there is no person outside of the overlap between the human detection areas B1 and B2 of the respective human detection sensors 14 of the unit A2 and adjacent unit A1 (N), the processing unit CPU advances to the process of step S5A, but when there is any person outside the overlap (Y), the processing unit CPU advances to step S7. In step S5A, when the number of detection area overlaps between the unit A2 and adjacent unit A1 is smaller than the number of detection area overlaps between the unit A2 and adjacent unit A3 (Y), the processing unit CPU advances to step ST but otherwise (N), the processing unit CPU advances to step S5B. In step S5B, when the number of detection area overlaps between the unit A2 and adjacent unit A1 is equal to the number of detection area overlaps between the unit A2 and adjacent unit A3 (Y), the processing unit CPU advances to step S6, but when the numbers of detection area overlaps are not equal (N), the processing unit CPU returns to step S1. Then, after step S5A (Y) and step S5B (Y), the processes of steps S7 to S9 described above are carried out, thereby stopping the operation of the unit A1 or reducing the outlet air volume of the unit A1.

As described above, when the three air-conditioning devices A1, A2, and A3 whose human detection areas B1, B2, and B3 overlap each other air-condition a same air-conditioning zone, the air-conditioning of an air-conditioning zone in which a person is present can be adjusted. This makes it possible to do air-conditioning without waste and without impairing comfort, by avoiding overcooling, and thereby increase energy savings.

Figure 8:
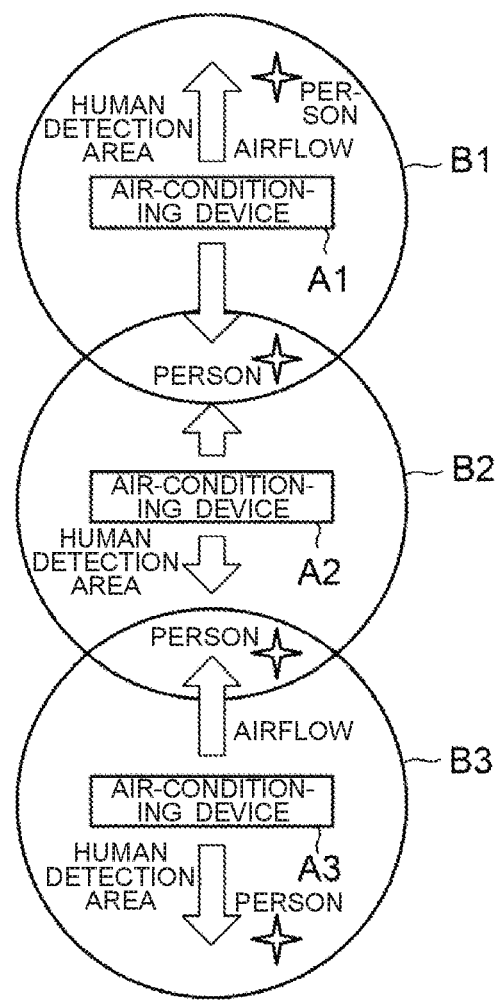
FIG. 8 is an explanatory diagram showing a control example of three air-conditioning devices.

Even when three air-conditioning devices A1, A2, and A3 are installed in a line, for example, as shown in FIG. 8, control is performed according to the process details described above. As shown in FIG. 8, under conditions in which the air-conditioning devices A1 and A3 on the opposite ends cannot reduce their outlet air volumes in relation to the air-conditioning device A2 sandwiched between the air-conditioning devices A1 and A3, the human detection area of the sandwiched air-conditioning device A2 can be air-conditioned by the air-conditioning devices A1 and A3 other than the air-conditioning device A2, and the air-conditioning device A2 can be controlled to reduce its outlet air volume.

Figure 9:
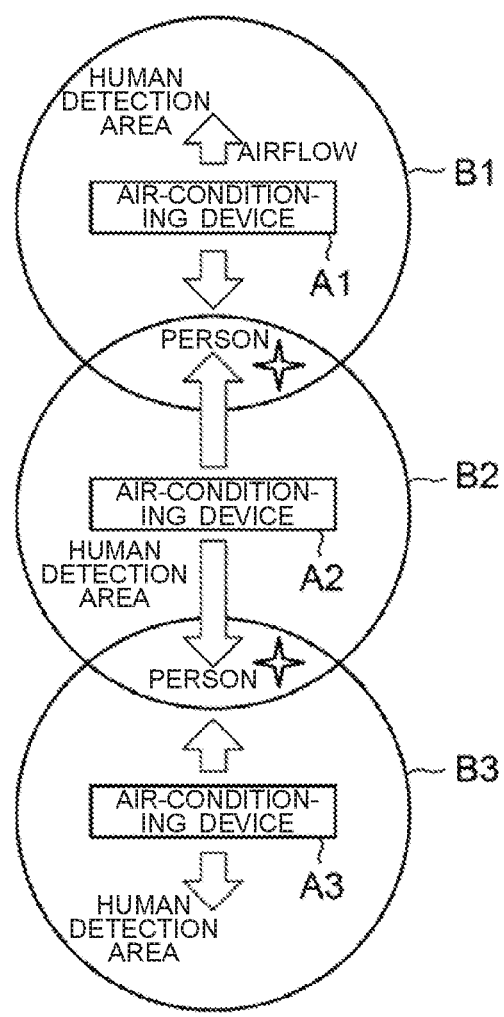
FIG. 9 is an explanatory diagram showing another control example of three air-conditioning devices.

Conversely, when the air-conditioning device A1 and air-conditioning device A3 are enabled to reduce their outlet air volumes, the air-conditioning device A1 and air-conditioning device A3 are controlled to reduce their outlet air volumes without reducing the outlet air volume of the air-conditioning device A2 as shown in FIG. 9.

Also, when four or more air-conditioning devices are installed adjacent to one another, the air-conditioning devices enabled to reduce their outlet air volumes are controlled to reduce the outlet air volumes according to the conditions described above.

Secondly, an indirect airflow control mode is used in the Auto mode when the angles (airflow direction settings) of the vanes 6 adapted to adjust the airflow direction of air-conditioned outlet air has not been set and an indirect airflow function has been set via the remote control 11. Indirect airflow control involves orienting the airflow direction horizontally upon detecting a person, to prevent the person from direct exposure to the airflow. In indirect airflow control, air-conditioning devices are also caused to reduce their outlet air volumes under the same conditions as direct airflow control.

Also, when an air-conditioning device adapted to operate in direct airflow control mode and an air-conditioning device adapted to operate in indirect airflow control mode are located adjacent to each other, the process of reducing outlet air volumes can be performed by following Rules 1, 2, and 3 described earlier.

Note that although in the above embodiments, a vane has been illustrated as an example of an airflow direction adjuster, the present invention is not limited to this, and, for example, a louver may be applied as an airflow direction adjuster.

REFERENCE SIGNS LIST

1 body casing 2 fan 5 air outlet 6 vane (airflow direction adjuster) 7 air inlet 10 controller 11 remote control (position setting device) 12 inlet air temperature sensor 13 refrigerant pipe temperature sensor 14 human detection sensor 15 GPS sensor (position setting device) A, A1, A2, A3 air-conditioning device B1, B2, B3 human detection area

The invention claimed is:

1. An air-conditioning system comprising two or more air-conditioning devices,
   each of the air-conditioning devices including
      a fan configured to adjust a volume of air blown out into a space to be air-conditioned,
      a human detection sensor configured to detect human presence,
      a position setting device used to set an installation location of each of the air-conditioning devices, and
      a controller configured to control the fan;
   the controller being configured to calculate a positional relationship with an adjacent air-conditioning device based on input signal data from the position setting device and calculate a human detection area overlap based on a human detection area of the human detection sensor in the adjacent air-conditioning device,
   the air-conditioning system being configured to follow rule 1 where it is stipulated that any air-conditioning device that detects a person outside the human detection area overlap between human detection sensors does not reduce an own outlet air volume.

2. The air-conditioning system of claim 1, wherein the air-conditioning system follows rule 2 where
   it is stipulated that when two air-conditioning devices are located adjacent to each other, any air-conditioning device that detects no person outside a human detection area overlap between human detection sensors is able to reduce an own outlet air volume when an air-conditioning device with the overlapping human detection area is unable to reduce an own outlet air volume, while when the air-conditioning device with the overlapping human detection area is able to reduce the own outlet air volume, only one of the air-conditioning devices is allowed to reduce the own outlet air volume, and whichever has a smaller temperature difference between a target inlet air temperature and a detected inlet air temperature, the outlet air volume of the air-conditioning device is reduced.

3. The air-conditioning system of claim 1, wherein air-conditioning system follows rule 3 where
   it is stipulated
   that when three or more air-conditioning devices are located next to one another, when an air-conditioning device having the human detection area by the human detection sensor that overlaps with one air-conditioning device is located adjacent to an air-conditioning device having the human detection area that overlaps with two air-conditioning devices, priority for outlet air volume reduction is given to the air-conditioning device having the human detection area that overlaps with one air-conditioning device and either one of the air-conditioning devices located adjacent to each other is enabled to reduce an own outlet air volume, giving a higher priority for the outlet air volume reduction to an air-conditioning device with the fewer human detection area overlaps; and when air-conditioning devices with the same number of overlaps are located adjacent to each other, a higher priority for the outlet air volume reduction is given to an air-conditioning device having a smaller difference between a target inlet air temperature and a detected inlet air temperature.

4. The air-conditioning system of claim 1, wherein each of the air-conditioning devices further includes
   an airflow direction adjuster configured to adjust an airflow direction of outlet air blown out by the fan, and
   an inlet air temperature sensor configured to detect temperature of inlet air sucked in by the fan, and
   wherein the controller is configured to control the airflow direction adjuster.

5. The air-conditioning system of claim 4, wherein the controller of the air-conditioning device is configured to automatically make settings of an airflow direction and an outlet air volume, includes a direct airflow control mode in which a person is exposed to airflow or an indirect airflow control mode in which a person is not exposed to airflow, and have a function to automatically reduce the outlet air volume or stop operation of the air-conditioning device and an energy-saving setting function of setting a reduction level of the outlet air volume via a remote control, when carrying out the direct airflow control mode or the indirect airflow control mode.

6. An air-conditioning system comprising two or more air-conditioning devices,
   each of the air-conditioning devices including
      a fan configured to adjust a volume of air blown out into a space to be air-conditioned,
      a human detection sensor configured to detect human presence,
      a position setting device used to set an installation location of each of the air-conditioning devices, and
      a controller configured to control the fan;
   the controller being configured to
      calculate a positional relationship with an adjacent air-conditioning device based on input signal data from the position setting device,
      calculate a human detection area overlap based on a human detection area of the human detection sensor in the adjacent air-conditioning device, and when a person is detected only in the human detection area overlap, and when a human detection sensor in the adjacent air-conditioning device detects a person outside the human detection area overlap, reduce an air volume of the fan.

7. The air-conditioning system of claim 6, wherein each of the air-conditioning devices further includes
an airflow direction adjuster configured to adjust an airflow direction of outlet air blown out by the fan, and
an inlet air temperature sensor configured to detect temperature of inlet air sucked in by the fan, and
wherein the controller is configured to control the airflow direction adjuster.

8. The air-conditioning system of claim 7, wherein the controller of the air-conditioning device is configured to automatically make settings of an airflow direction and an outlet air volume, includes a direct airflow control mode in which a person is exposed to airflow or an indirect airflow control mode in which a person is not exposed to airflow, and have a function to automatically reduce the outlet air volume or stop operation of the air-conditioning device and an energy-saving setting function of setting a reduction level of the outlet air volume via a remote control, when carrying out the direct airflow control mode or the indirect airflow control mode.

9. The air-conditioning system of claim 6, wherein air-conditioning system follows rule 1 and rule 2, where:
rule 1 stipulates that any air-conditioning device that detects a person outside a human detection area overlap between human detection sensors does not reduce an own outlet air volume, and
rule 2 stipulates that when two air-conditioning devices are located adjacent to each other, any air-conditioning device that detects no person outside a human detection area overlap between human detection sensors is able to reduce an own outlet air volume when an air-conditioning device with an overlapping human detection area is unable to reduce an own outlet air volume, while when the air-conditioning device with the overlapping human detection area is able to reduce the own outlet air volume, only one of the air-conditioning devices is allowed to reduce the own outlet air volume, and whichever has a smaller temperature difference between a target inlet air temperature and a detected inlet air temperature, the outlet air volume of the air-conditioning device is reduced.

10. The air-conditioning system of claim 6, wherein the air-conditioning system follows rule 1 and rule 3, where:
rule 1 stipulates that any air-conditioning device that detects a person outside a human detection area overlap between human detection sensors does not reduce an own outlet air volume, and
rule 3 stipulates that when three or more air-conditioning devices are located next to one another, when an air-conditioning device having the human detection area by the human detection sensor that overlaps with one air-conditioning device is located adjacent to an air-conditioning device having the human detection area that overlaps with two air-conditioning devices, priority for outlet air volume reduction is given to the air-conditioning device having the human detection area that overlaps with one air-conditioning device and either one of the air-conditioning devices located adjacent to each other is enabled to reduce an own outlet air volume, giving a higher priority for the outlet air volume reduction to an air-conditioning device with the fewer human detection area overlaps; and when air-conditioning devices with the same number of overlaps are located adjacent to each other, a higher priority for the outlet air volume reduction is given to an air-conditioning device having a smaller difference between a target inlet air temperature and a detected inlet air temperature.

\* \* \* \* \*